(12) United States Patent
Hotter

(10) Patent No.: US 10,176,914 B2
(45) Date of Patent: Jan. 8, 2019

(54) ELECTRIC POWER CONTROL WITH A DITHER SIGNAL

(71) Applicant: ZF Friedrichshafen AG, Friedrichshafen (DE)

(72) Inventor: Dominik Hotter, Wörth a. d. Isar (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 12 days.

(21) Appl. No.: 15/455,729

(22) Filed: Mar. 10, 2017

(65) Prior Publication Data

US 2017/0287609 A1    Oct. 5, 2017

(30) Foreign Application Priority Data

Mar. 31, 2016  (DE) .................. 10 2016 205 312

(51) Int. Cl.
| | |
|---|---|
| *H01F 7/06* | (2006.01) |
| *F02D 41/20* | (2006.01) |
| *F16K 31/06* | (2006.01) |
| *H01F 7/18* | (2006.01) |
| *H02M 3/00* | (2006.01) |
| *G05D 16/20* | (2006.01) |

(52) U.S. Cl.
CPC ............. *H01F 7/064* (2013.01); *F02D 41/20* (2013.01); *F16K 31/0675* (2013.01); *G05D 16/2013* (2013.01); *H01F 7/1844* (2013.01); *H02M 3/00* (2013.01); *F02D 2041/2024* (2013.01); *F02D 2041/2031* (2013.01); *H01F 2007/1861* (2013.01); *H01F 2007/1866* (2013.01); *H01F 2007/1888* (2013.01)

(58) Field of Classification Search
CPC ............... H01F 7/064; H01F 7/1844; H01F 2007/1866; H01F 2007/1861; H01F 2007/1888; F16K 31/0675; G05D 16/2013; H02M 3/00; F02D 41/20; F02D 2041/2031; F02D 2041/2024; F02D 2041/2027

See application file for complete search history.

(56) References Cited

U.S. PATENT DOCUMENTS

| | | | | |
|---|---|---|---|---|
| 5,673,166 | A  * | 9/1997 | Hoffman | .............. H01H 47/325 361/160 |
| 7,853,360 | B2 * | 12/2010 | Kissler Fernandez | ....................... G05D 16/2013 700/275 |
| 2004/0003788 | A1 * | 1/2004 | Taylor | ..................... F01L 1/022 123/90.15 |

(Continued)

*Primary Examiner* — Ian G Paquette
(74) *Attorney, Agent, or Firm* — Brinks Gilson & Lione

(57) ABSTRACT

A method for controlling a current flowing through a consumer comprises the following steps, which are periodically traversed: determining a dither current based on a dither signal and a definite point in time, wherein the dither signal is determined by a frequency, an amplitude and a signal form and actuating a flow control valve to produce the sum of a target current and the determined dither current by the consumer. Furthermore, the method comprises determining an indication to the current flowing through the consumer; compensating the indication by the factor of the dither current; and providing the indication, wherein the determination of the dither current and the determination of the indication are synchronized with each other in a predetermined way.

20 Claims, 4 Drawing Sheets

(56) References Cited

U.S. PATENT DOCUMENTS

| | | | |
|---|---|---|---|
| 2009/0085544 A1* | 4/2009 | Hartlieb | H01F 7/18 |
| | | | 323/283 |
| 2014/0254058 A1* | 9/2014 | Suzuki | H01H 47/325 |
| | | | 361/153 |
| 2017/0062110 A1* | 3/2017 | Matsumoto | H01F 7/064 |
| 2017/0125148 A1* | 5/2017 | Hofer | H01F 7/18 |
| 2018/0163857 A1* | 6/2018 | Ishihara | F16H 61/0021 |

\* cited by examiner

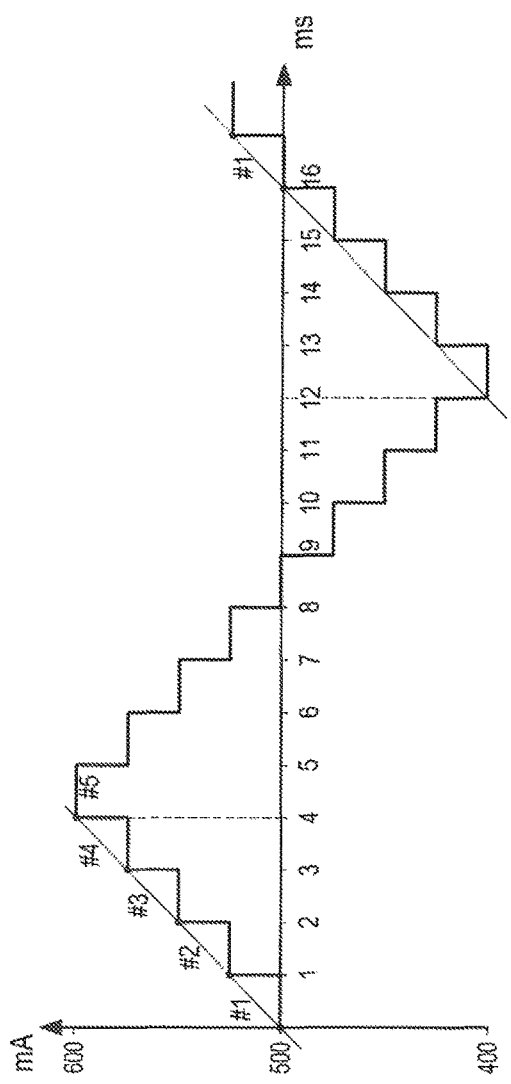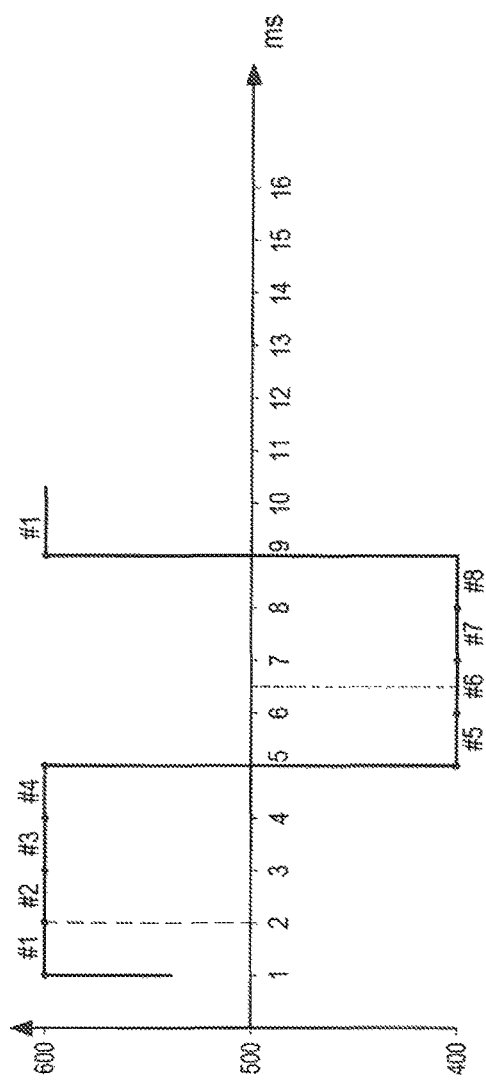
Fig. 4A
Fig. 4B

ELECTRIC POWER CONTROL WITH A DITHER SIGNAL

RELATED APPLICATIONS

This application claims the benefit and priority of German Patent Application DE 10 2016 205 312.4, filed Mar. 31, 2016, which is incorporated by reference herein in its entirety.

BACKGROUND

1. Technical Field

The invention relates to controlling an electromagnetic valve by means of a dither signal. In particular, the invention relates to the verification of an electric current flowing through the valve.

2. Background Information

A valve, which can be controlled in an electromagnetic manner, comprises an actuator with an electrical coil, a movable magnetic anchor and a return spring, as well as a flow rate component for controlling a flow of fluid. The position of the anchor has an effect on the flow rate component so that the flow of fluid can be controlled by the coil, based on an electric current. To reduce a mechanical hysteresis of the arrangement, the anchor can be kept in constant movement at a very low amplitude. For this purpose, the coil can be controlled with a pulse-width modulated (PWM) signal or with direct current, which is superimposed by a dither signal with low amplitude. An integrated circuit for controlling a coil in such a way can be obtained under the name Infineon TLE8242.

In a safety-relevant system, for example, a hydraulic transmission control unit, the position of the anchor shall be verified based on the current actually flowing through the coil, so as to determine an error if the intended and the reconstructed electrical current differ from each other. For the verification process, the current of the dither signal has to be taken into consideration. The circuit described above allows for scanning the produced current. However, for many purposes, the determination is too imprecise. The produced current can also be determined by reading for each respective period of the dither signal the average switch-on and switch-off time of a flow control valve controlled via PWM.

The frequency, form, phase or amplitude of the dither signal can be changed to support, for example, a quick change of the current flowing through the coil. The determination of the average switch-on and switch-off has to be adjusted to the changed dither signal, so that the current determination, based on average switching times, can be temporarily useless.

BRIEF SUMMARY

The invention is based on the objective to provide an improved technology for controlling an electrical current flowing through a consumer via a dither signal. The invention achieves this objective by means of the subject matter of the independent claims. Preferred embodiments are described in the sub-claims.

A method for controlling a current flowing through a consumer comprises the following steps, which are periodically traversed: determining a dither current based on a dither signal and a definite point in time, wherein the dither signal is determined by a frequency, an amplitude and a signal form; and controlling a flow control valve to produce the sum of a target current and the respective dither current by the consumer. Furthermore, the method comprises the act of determining an indication to the current flowing through the consumer; compensating the indication by the factor of the dither current; and providing the indication. At the same time, the determination of the dither current and the determination of the indication are synchronized with each other in a predetermined way.

By means of the predetermined synchronization, i.e., the fixed or known temporal coupling, the indication can be compensated or adjusted in an improved manner by the factor of the dither signal. In addition, it is possible to change the dither signal, for example, its frequency, its amplitude or its signal form, without losing the synchronization between the determination of the dither current and the determination of the indication. In particular, dithering can be controlled depending on the target current. For example, a change of the current flowing through a consumer can be supported via a temporary change of the dither signal. It is also possible to support in an improved manner the different target currents with different dither signals. At the same time, the determination of the indication can be maintained so that a verification of the current, i.e., comparing the indication with the target current, is not interrupted and does not supply useless results.

It is preferred that the dither current remains constant throughout a cycle of the method. In particular, the dither current can be controlled by means of a digital flow control valve, which has no intermediate positions, only a closed position and an open position. The current can be controlled via a timing relationship of periods of the closed and the open position in the form of pulse-width modulation (PWM). Usually, the dither signal is divided into a number of dither steps, wherein a dither step corresponds to a cycle of the method. The indication to the current flowing through the consumer can be compensated in an improved manner by the factor of the dither current, because it is constant during the cycle and, accordingly, can be easily adopted and reconstructed.

The determination of the indication can be completed within a cycle of the method, wherein it is not required to average observed values over multiple dither steps, for example, a dither period. The determined indication compensated by the dither current can be used in an improved manner to verify the current flowing through the consumer. As a result, it is possible to increase the accuracy and determination speed. However, in a different embodiment, it is also possible to use multiple dither steps for determining the produced current. In particular, it is possible to consider dither steps of a dither period, wherein switch-on and switch-off times of the flow control valve can be averaged.

Basically, it is possible to use the method with any signal form, frequency or amplitude of the dither signal. Merely the frequency of the cycles of the method should be greater, in particular, several times greater, than the frequency of the dither signal to ensure that multiple dither steps are available in one dither period. It is especially preferred that the dither signal has periodically the average value zero. In this way, it can be ensured that the current flowing through the consumer assumes the temporal average value of the target current and is not increased or reduced in the long term by the dither current.

This can be especially important when the consumer comprises a current-controlled actuator, by means of which a process should be influenced in line with a control or regulating system. For example, the consumer can comprise a current-controlled valve, especially a continuously adjustable valve, in which the flow rate of the fluid can be controlled via the current. In the constellation described, the target current can specify a desired fluid flow through the continuously adjustable valve and the dither signal can produce a suitable hysteresis reduction, without influencing the temporal average value of the target current.

The current can be controlled by the consumer by opening and closing a digital flow control valve in a predetermined time relationship. Conversely, the current flowing through the consumer can be determined or verified based on a time relationship of opening and closing the flow control valve. For example, a transistor (for example, the type FET or IGBT) can be used simply and cost-effectively as a flow control valve. The current control can also be performed by using an integrated circuit, wherein it is preferred that the circuit only adjusts the sum of the target current and the dither current at the consumer and does not superimpose and additional dither current. In one embodiment, the above-mentioned circuit TLE8242 can be used for producing the current.

If, during a cycle of the method, a request for a change of the dither signal is detected, the request can be implemented immediately or with a delay. The immediate implementation cannot affect the determination of the indication or the compensation of the indication by the factor of the dither current. This applies especially when the determination of the indication is restricted to observed values of a dither step. If values of multiple dither steps are averaged for compensating an indication, an algorithmic correction of the average value can also be determined by changing the dither signal, so that the compensation can also be maintained in a dither period consisting of sections of two different dither signals.

With the delayed implementation of the request, it is preferred to wait until the current period of the dither signal is completed before implementing the change. In particular, the change can be implemented after the most recent cycle of the current period of the dither signal or at the start of the first cycle of a following period. In this way, it can be avoided that an extended dither period with sections of multiple dither signals is actuated in a temporal transition area.

A computer program product comprises program code means for performing the above-mention method, when the computer program product is performed on a processing device or stored on a computer-readable medium. It is especially preferred that the method is executed on a processing device, which is designed in the form of a programmable microcomputer or microcontroller.

A device for controlling the current flowing through a consumer comprises a determining device for determining a dither current, based on a dither signal and a definite point in time, wherein the dither signal is determined via a frequency, an amplitude and a signal form; an actuating device for controlling a flow control valve to produce the sum of a target current and the specific dither current by the consumer; and a clock generator for actuating the determining device to periodically perform the determination. Furthermore, a scanner is provided for scanning an indication on a current flowing through the consumer and supplying the indication compensated by a factor of the dither current. At the same time, the determining device and the scanner are synchronized with each other in a predetermined way.

In a preferred embodiment, the device comprises also an actuating device for actuating an actuating device, which produces the current flowing through the consumer. In particular, the actuating device can supply the current to be actuated in the form of an activation signal of the actuating device. Furthermore, the actuating device can preferably comprise a pulse-width modulator, especially for actuating a digital flow control valve.

BRIEF DESCRIPTION OF THE DRAWINGS

Subsequently, the invention is described in more detail with reference to the figures, which represent in:

FIG. 4A is an exemplary production of a dither signal for the device shown in FIG. 1 wherein a triangular signal form is used; and FIG. 4B is an exemplary production of a dither signal for the device shown in FIG. 1 wherein a rectangular signal form is used.

DETAILED DESCRIPTION OF THE DRAWINGS AND THE PRESENTLY PREFERRED EMBODIMENTS

Figure 1:
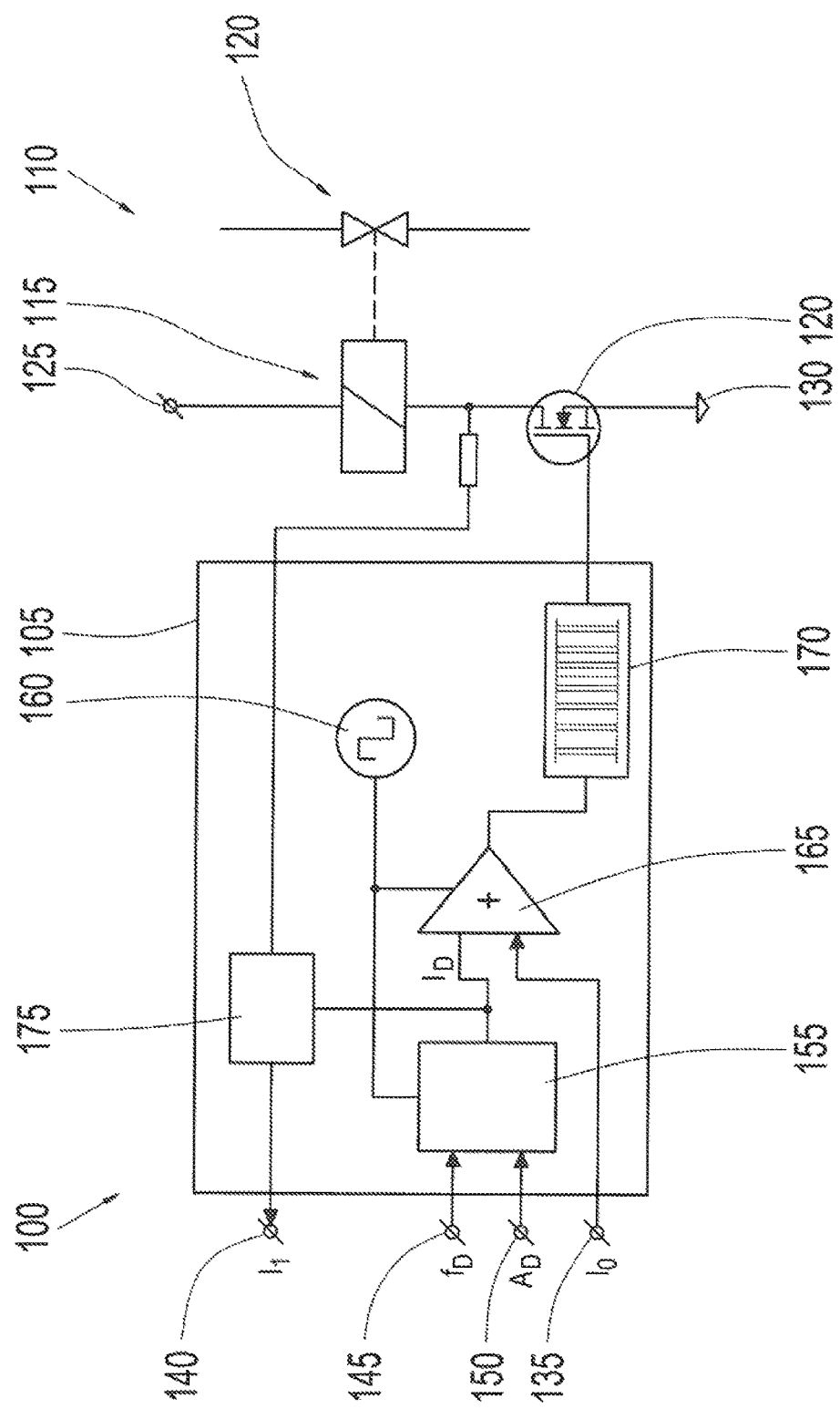
FIG. 1 is a device for controlling a current flowing through an actuator.

FIG. 1 shows a system 100 for controlling a process in an electrohydraulic or electropneumatic manner. The system comprises a control device 105 and an electrically controllable valve 110. In the valve 110 an electrical actuator 115 acts on a flow rate component 120, which affects the flow of a hydraulic or pneumatic fluid.

In particular, the electrical actuator 115 can comprise a coil for producing a magnetic field, wherein the magnetic field can act on a generally spring-loaded anchor, the position of which is affected via a current flowing through the coil. In this way, the electrical current flowing through the valve 110 can be used for controlling a fluid in order to control a process. For example, this process can comprise changing an engaged gear in a transmission, for example, for a motor vehicle.

The electrical actuator 115 functions for the control device 105 as an electrical consumer, wherein the control device 105 can also be used for supplying other consumers with power. In particular, the current flowing through the actuator 115 can be controlled via a flow control valve 120, which can connect a connection of the actuator 115 with a high potential 125 or a low potential 130 of a current source. In the selected embodiment, the flow control valve 120 can only be opened or closed, an intermediate position is not available. However, if the flow control valve 120 closed and opened alternately, a current is produced by the actuator 115, the amount of which depends on a relationship of durations of the closed and opened condition of the flow control valve 120. To control the flow control valve 120, it is possible to use a pulse-width modulation (PWM) or a pulse frequency modulation (PFM).

In general, the control device 105 can be implemented as an information-processing device, for example, a programmable microcomputer, or in the form of discreet logic or components. The control device 105 comprises a first input 135 for the specification of a target current $I_0$ and furthermore prefers an output 140 for supplying an indication for an actual current $I_1$ by the actuator 115. The inputs and outputs of the control device can be implemented in any manner, for example, in the form of logical interfaces or voltage-controlled or current-controlled interfaces.

Preferably, the current, which is produced by the actuator 115, consists of two components, namely the target current $I_0$ and a dither current $I_D$, which can be formed based on a dither signal. At the same time, the dither current or the dither signal can be influenced. For example, it is possible to provide a second input 145 for scanning a specification of a dither frequency $f_D$ or a third 150 input for scanning a specification of a dither amplitude $A_D$. Preferably, the dither signal is periodical and has the average value zero. Different signal forms of the dither signal can be used, for example, a square-wave signal or triangular signal, also a trapezoidal signal or a different signal, wherein in one embodiment a further input for scanning a specification for the desired signal form can be provided.

The control device 105 comprises a determining device 155 for determining the dither current, based on the dither signal. The dither signal is time-dependent, and therefore the specific dither current is also time-dependent. It is preferred that the dither current is determined periodically, for example, with a frequency of 1000 Hz, and the specific dither current is then held constant during a dither step (here: $\frac{1}{1000}$ s). For this purpose, the determining device 155 can be disposed to determine the dither current periodically, based on the pulse of a clock generator 160. A summing unit 165 can be provided for forming the sum of the target current $1_0$ and the dither current $1_D$ and, in one embodiment, supply its results with the pulse of the clock generator 160. The supplied sum of the currents can be prepared by means of an actuating device 170 in such a way that the flow control valve 120 or a different device for controlling the current flowing through the actuator 115 can be actuated. In particular, the actuating device 170 can comprise a pulse modulator, preferably a pulse-width modulator.

To verify the current flowing through the actuator 115, the target current $1_0$ is usually compared with the actual current $I_1$. If both currents differ from each other by more than a predetermined amount, it is possible to determine an error in the system 100. The actual current $I_1$ can be determined directly, for example, based on a voltage drop at a series resistance (shunt) in the circuit of the actuator 115. It can also be sufficient to determine an indication to the actual current $I_1$ by scanning, for example, opening and closing durations of the flow control valve 120. These durations can be determined individually for a dither step or combined for the dither steps of a dither period and can be divided by the number of dither steps to determine average durations. Based on a relationship of the determined durations, it is possible to determine in the form of a reversed pulse-width modulation the actual current $I_1$ by means of a scanner 175.

However, to allow for a direct comparison with the target current $I_0$, it is necessary with the individual consideration to subtract the proportion of the dither current $I_D$ from the actual current $I_1$. For this purpose, the scanner 175 can be connected with the determining device 155. In one embodiment, the scanner 175 provides via the output 140 the actual current $I_1$ adjusted by the dither current $I_D$. In a different embodiment, the scanner 175 can also perform the comparison with the target current $I_0$ by itself, and provide a plausibility signal to the outside, which indicates whether both currents are sufficiently enough of the same size.

It is proposed that the determining device 155 and the scanner 175 are synchronized with each other in a predetermined way, so that their temporal performances have a well-established proportion. In a simple embodiment, the determination of both elements 155, 175 relate to the same dither step, so that the actual current $I_1$ can always be determined for the current dither step. In a different embodiment, the scanner 175 is designed to perform the indication to the current flowing through the actuator 115 based on scans, which relate to multiple dither steps, for example, an entire dither period or longer. For example, switch-on and switch-off durations of the flow control valve 120 can be determined cumulatively for a predetermined time period, and the accumulated value can be divided by the number of dither steps. In this way, it is possible to determine the actual current $I_1$ as an average value for the time period.

If now, during an ongoing period, a parameter of the dither signal is changed, for example, a dither frequency, it can be complicated to form the correct average. However, through the synchronization with the determining device 155, the scanner 175 is always informed about the dither signal determined in the current dither step. As a result, it is possible to consider the dither signal or the dither current even beyond the change.

The synchronization can involve that the determinations of the determining device 155 and the scanner 175 relate to the same time period, respectively, in which the current flowing through the actuator 115 remains constant, at least nominally. In a different embodiment, a synchronization signal is provided from the determining device 155 to the scanner 175 to display the change of the dither parameters. An ongoing determination of the actual current I1 involving multiple dither steps can then be rejected and a new dither period can be started. The determination can also be continued under consideration of the new dither parameters.

Figure 2:
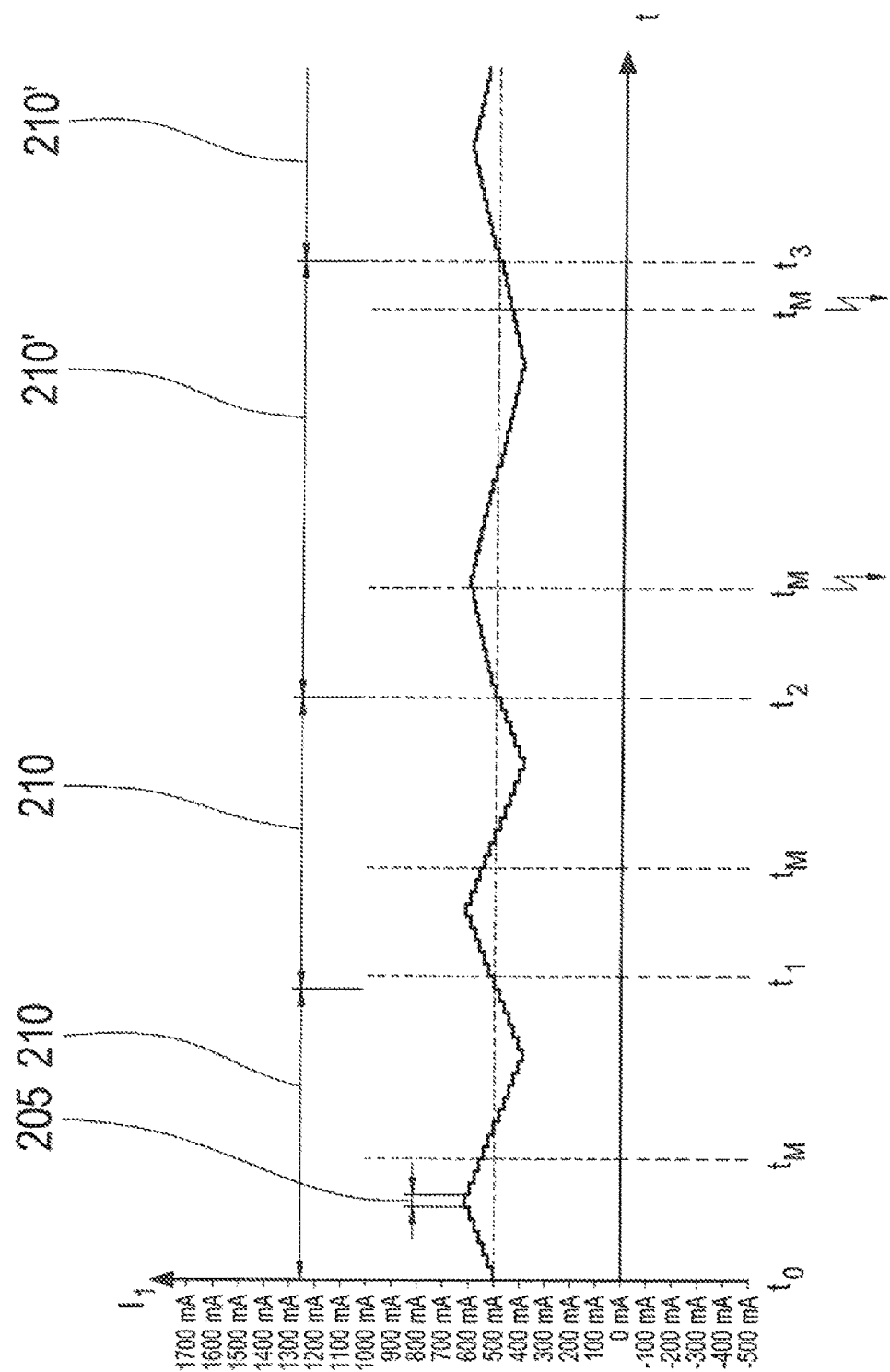
FIG. 2 is a temporal course of a current flowing through the actuator shown in FIG. 1.

FIG. 2 shows a temporal course of a current $I_1$ flowing through the actuator 115 shown in FIG. 1. The values shown should be considered in a purely exemplary manner. A target current $I_0$ of 500 mA is superimposed by a triangular dither current $I_D$ with an amplitude of 200 mA and a frequency of 130.2 Hz. The duration of a dither step 205 is constant. At the beginning of the representation, starting at a point in time $t_0$, a dither period 210 consists of 24 dither steps 205. At points in time $t_M$ the actual current $I_1$ is determined by averaging the currents or corresponding switching times of the flow control valve 120 for the past dither steps 205 of a dither period 210. At the same time, the actual point in time $t_M$ within a dither period 210 is not important. If the points in time $t_M$ are at intervals of a dither period 210, a continuous determination is possible.

At a point in time $t_1$ a request for changing a dither frequency is received, which should be implemented by changing the number of dither steps 205 of a dither period 210. However, the change is not performed immediately, but only at the end of the ongoing dither period 210 at a point in time $t_2$. The determination of the actual current between $t_1$ and $t_2$ is not affected by this because the parameters of the dither signal have not changed. However, without taking the change into consideration, the following two determinations are incorrect because the new dither period 210' comprises more than 24 steps 205. Only beginning at point in time $t_3$, when a completely new dither period 210' elapsed, correct determinations for the past dither period 210' can be performed.

If the request is implemented immediately at point in time $t_1$, without synchronizing the determination with the generation of the dither current, a period in which no reliable verification of the current flowing through the actuator 115 is available, is even longer. A current measurement has to be rejected, and it has to be waited until a new dither period 210' has safely started and then until it has completely elapsed.

Figure 3:
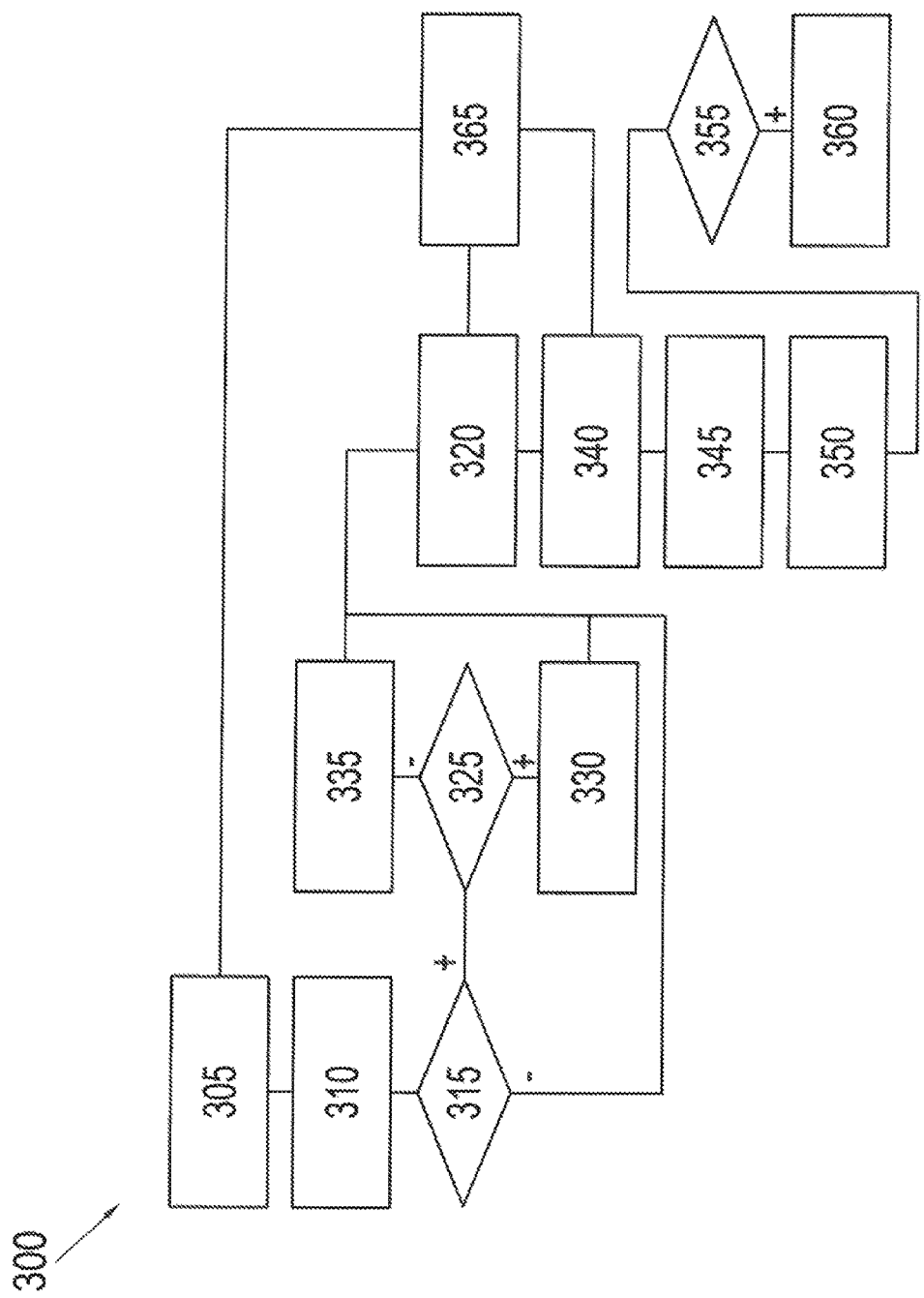
FIG. 3 is a flow diagram of a method for controlling a current flowing through an actuator.

FIG. 3 shows a flow diagram of a method 300 for producing a dither signal for the control device shown in FIG. 1. In particular, the method 300 is designed for a periodic performance or periodic cycle, for example, based on the pulse of the clock generator 160. In particular, a cycle can correspond to a dither step 205.

In a first step 305, the target current $I_0$ is determined. Then, it is possible to determine in step 310 the frequency and/or amplitude of the dither signal. In step 315, it can be determined whether the specifications of step 310 have changed when compared to a past cycle of the method 300. If this is not the case, the dither current can be determined in step 320, depending on the time. In particular, the time can correspond to a request time of the method 300. Preferably, first of all the dither signal is determined in step 320 and then implemented into the dither current, especially by means of a linear representation.

In one embodiment, it is also possible to implement a bypass function which directly effects the actuation of the target current $I_0$, without connecting a dither current. For example, the bypass function can be released when the target current $I_0$, the dither frequency or the dither amplitude shows the value zero.

If a change of the dither specifications has been determined in step 315, it is possible to examine in step 325 whether the specifications should be immediately adopted, whereupon they can be adopted in step 330, or when the current dither period 210 has been completed, whereupon a respective flag can be placed in step 335. Subsequently, the above-mentioned step 320 is performed in any case.

Subsequently, the actual current $I_1$ or an indication to it can be determined in step 340. In particular, the indication can be determined based on the switching times of the flow control valve 120. Preferably, the actual current can be determined from the indication by means of linear mathematical operation. In one embodiment, this step is not performed in each cycle of the method 300 but, for example, only once per dither period 210.

In step 345, the sum of the target current $I_0$ is formed from step 305 and the dither current $I_D$ from step 320 and in the subsequent step 350, the sum is implemented, for example, by appropriately actuating the flow control valve 120. The actuation of step 350 can comprise a transfer of the specific total current to an appropriate signal, for example, a PWM signal.

In step 355, it can be tested whether the flag of 335 has been placed and, at the same time, the predetermined point in time has arrived for applying the changed specifications. If this is the case, the new specifications can be applied in step 360. Preferably, the new specifications are applied at the limit between two dither periods 210, i.e., approximately following the most recent dither step 205 of dither period 210 with the old parameters or prior to the first dither step 205 of dither period 210' with the new parameters.

Optionally, in step 365, the determined actual current $I_1$ can be reduced by the dither current $I_D$. For this purpose, it is possible to use the dither current (for example, the dither signal) formed in step 320 and the actual current $I_1$ scanned in step 340. For example, the results can be provided via output 140. In a further embodiment, it is also possible to perform an immediate comparison between the actual current $I_1$ adjusted by the dither current $I_D$ and the target current $I_0$. The results can be provided in an appropriate manner.

It is preferred that the control device 105 is arranged to process multiple instances of the method in parallel manner to be able to control multiple actuators 115 simultaneously. It is especially preferred that the respective dither steps 205 are identical in length and preferably synchronous with each other.

FIG. 4 shows an exemplary production of a dither signal or dither current for the control device 105, especially the determining device 155 shown in FIG. 1. In FIG. 4A, a triangular and in FIG. 4B a rectangular signal form is used. In an exemplary manner, $I_0$ has 500 mA and the duration of dither step 305 amounts to 1 ms. At the same time, the dither amplitude amounts to ±100 mA=200 mA. For the triangular form, the dither period 210 comprises 16 dither steps 205 (dither frequency 62.5 Hz) and for the rectangular form 8 dither steps 205 (dither frequency 125 Hz). The number of dither steps 205 per dither period is called "numsteps".

The procedure described below can be performed once in each dither step 205 to determine the respective amount of the dither signal and thus the strength of the dither current $I_D$, depending on the time. Advantageously, a serial number of the dither step 205 in the dither period 210 is used as measurement for the time, wherein the number is indicated in FIG. 4 with #1, #2, etc. In a different embodiment, the procedure can be traversed asynchronous to the limits of the dither steps 205. The current dither step 205 can be determined, based on a relationship of the frequencies of the performance of the method and the dither function and a request time.

In one embodiment, it is noted in a first variable ("directionflag"), whether the dither value should be increased or reduced in relation to the most recent dither step. Depending on the amplitude, minimum and maximum values ("maxvalue" and "minvalue") are predetermined which cannot be exceeded or fallen below. A second variable holds the amount of the change ("stepsize") and a third variable the number of dither steps 205, by means of which the maxvalue or minvalue should be maintained (numlimit").

With each request of the method, the amount stepsize is added to or subtracted from the dither value of the most recent dither step 205, depending on the directionflag. Furthermore, it is counted how often maxvalue or minvalue have been achieved. If the number corresponds to numlimit, it is reset and the directionflag is negated.

To FIG. 4A applies: numsteps=16; numlimit=1; stepsize= (dither amplitude*2/numsteps)=25 mA; minvalue=400 mA, maxvalue=600 mA.

Correspondingly, to FIG. 4B applies: numsteps=8; numlimit=/2=4; stepsize=(dither amplitude)=200 mA; minvalue=400 mA, maxvalue=600 mA.

REFERENCE NUMBERS 100 system
105 control device
110 valve
115 electrical actuator
120 flow rate component
125 high potential
130 low potential
135 first input for scanning specification target current $I_0$
140 output for providing indication to actual current $I_1$
145 second input for scanning specification dither frequency $f_D$
150 third input for scanning specification dither amplitude $A_D$
155 determining device 160 clock generator
165 summing unit
170 actuating device
175 scanner
205 dither step
210 dither period
300 method
305 determining target current
310 determining frequency and amplitude of the dither signal
315 specifications changed?
320 determining dither currency, depending on the time
325 applying immediately?
330 applying
335 placing flag
340 determining actual current
345 forming sum of target current and dither current
350 actuating flow control valve
355 final cycle and flag
360 applying
365 providing and comparing

What is claimed is:

1. A method for controlling a current flowing through an actuator, the method comprising:
    determining a dither current based on a dither signal and a definite point in time, wherein the dither signal is determined by a frequency, an amplitude and a signal form;
    actuating a flow control valve to produce the sum of a target current and the determined dither current by the actuator; wherein the determining of the dither current and the actuating of the flow control valve are periodically traversed;
    determining an indication to the current flowing through the actuator;
    compensating the indication by the factor of the dither current; and
    providing the indication;
    wherein the determining of the dither current and the determining of the indication are synchronized with each other in a predetermined way.

2. The method of claim 1, wherein during a cycle a request for a change of the dither signal is detected and the change is implemented immediately.

3. The method of claim 1, wherein during a cycle a request for a change of the dither signal is detected and the change is implemented only after the most recent cycle of the current period of the dither signal.

4. The method of claim 1, wherein the current is produced by the actuator by opening and closing a digital flow control valve in a predetermined time relationship.

5. The method of claim 4, wherein the current flowing through the actuator is determined based on a time relationship of opening and closing the flow control valve.

6. The method of claim 4, wherein during a cycle a request for a change of the dither signal is detected and the change is implemented immediately.

7. The method of claim 4, wherein during a cycle a request for a change of the dither signal is detected and the change is implemented only after the most recent cycle of the current period of the dither signal.

8. The method of claim 1, wherein the dither current remains constant during a cycle of the method.

9. The method of claim 8, wherein the dither signal has periodically the average value zero.

10. The method of claim 8, wherein during a cycle a request for a change of the dither signal is detected and the change is implemented immediately.

11. The method of claim 8, wherein during a cycle a request for a change of the dither signal is detected and the change is implemented only after the most recent cycle of the current period of the dither signal.

12. The method of claim 8, wherein the current is produced by the actuator by opening and closing a digital flow control valve in a predetermined time relationship.

13. The method of claim 12, wherein the current flowing through the actuator is determined based on a time relationship of opening and closing the flow control valve.

14. The method of claim 1, wherein the dither signal has periodically the average value zero.

15. The method of claim 14, wherein during a cycle a request for a change of the dither signal is detected and the change is implemented immediately.

16. The method of claim 14, wherein during a cycle a request for a change of the dither signal is detected and the change is implemented only after the most recent cycle of the current period of the dither signal.

17. The method of claim 14, wherein the current is produced by the actuator by opening and closing a digital flow control valve in a predetermined time relationship.

18. The method of claim 17, wherein the current flowing through the actuator is determined based on a time relationship of opening and closing the flow control valve.

19. A computer program comprising program code for performing a method;
    wherein the method of the program code comprises determining a dither current based on a dither signal and a definite point in time, wherein the dither signal is determined by a frequency, an amplitude and a signal form; actuating a flow control valve to produce the sum of a target current and the determined dither current by the actuator; wherein the determining of the dither current and the actuating of the flow control valve are periodically traversed; determining an indication to the current flowing through the actuator; compensating the indication by the factor of the dither current; and providing the indication;
    wherein the determining of the dither current and the determining of the indication are synchronized with each other in a predetermined way; and
    wherein the computer program is performed on a processing device or stored on a computer-readable medium.

20. A device for controlling a current flowing through an actuator, the device comprising:
    a determining device for determining a dither current, based on a dither signal and a definite point in time, wherein the dither signal is determined via a frequency, an amplitude and a signal form;
    an actuating device for controlling a flow control valve to produce the sum of a target current and the specific dither current;
    a clock generator for actuating the determining device to periodically perform the determination; and
    a scanner for scanning an indication on a current flowing through the actuator and supplying the indication compensated by a factor of the dither current;
    wherein the determining device is synchronized with the scanner in a predetermined way.

* * * * *